(12) United States Patent
Ventikos et al.

(10) Patent No.: US 9,620,247 B2
(45) Date of Patent: Apr. 11, 2017

(54) ENERGY FOCUSSING (75) Inventors: Yiannis Ventikos, Oxford (GB); Nicholas Hawker, Oxford (GB)

(73) Assignee: OXFORD UNIVERSITY INNOVATION LIMITED, Oxford (GB)

(*) Notice: Subject to any disclaimer, the term of this patent is extended or adjusted under 35 U.S.C. 154(b) by 520 days.

(21) Appl. No.: 13/511,856

(22) PCT Filed: Nov. 26, 2010

(86) PCT No.: PCT/GB2010/051976
§ 371 (c)(1),
(2), (4) Date: May 24, 2012

(87) PCT Pub. No.: WO2011/064594
PCT Pub. Date: Jun. 3, 2011

(65) Prior Publication Data
US 2012/0288047 A1 Nov. 15, 2012

(30) Foreign Application Priority Data
Nov. 27, 2009 (GB) .................................. 0920816.6

(51) Int. Cl.
*F03B 17/02* (2006.01)
*G21B 3/00* (2006.01)

(52) U.S. Cl.
CPC .................... *G21B 3/006* (2013.01)

(58) Field of Classification Search
USPC ........................................... 376/108; 175/67
See application file for complete search history.

(56) References Cited

U.S. PATENT DOCUMENTS 3,417,829 A * 12/1968 Acheson .................. E21B 7/18
                                                175/67
3,624,239 A * 11/1971 Fraas ........................ G21B 1/03
                                                376/103
3,953,617 A    4/1976 Smith et al.
(Continued)

FOREIGN PATENT DOCUMENTS

CN        1603772 A    4/2005
CN      102759439 A   10/2012
(Continued)

OTHER PUBLICATIONS

Brenner et al., "Single-bubble sonoluminescence," Rev. Mod. Phys. v. 74, Apr. 2002 p. 425.*
(Continued)

*Primary Examiner* — Sean P Burke
(74) *Attorney, Agent, or Firm* — Cantor Colburn LLP (57) ABSTRACT

A method of producing a localized concentration of energy includes providing a series of projectiles and firing the projectiles at a target. An apparatus for producing localized concentration of energy includes: a mechanism to provide a series of projectiles and a mechanism to fire the projectiles at a target. The target is configured such that upon striking the target, a projectile traps and compresses a volume of gas between the projectile and the target. The target and the projectile are also configured such that impact of the projectile onto the target gives rise to a converging shockwave inside the trapped volume of gas.

12 Claims, 4 Drawing Sheets

(56) References Cited

U.S. PATENT DOCUMENTS

| | | | |
|---|---|---|---|
| 2003/0215046 | A1 | 11/2003 | Hornkohl |
| 2006/0187277 | A1 | 8/2006 | Dean, Jr. et al. |
| 2008/0037694 | A1 | 2/2008 | Dean, Jr. et al. |
| 2010/0124142 | A1 | 5/2010 | Laugharn, Jr. et al. |
| 2011/0228890 | A1* | 9/2011 | Dean et al. ............. 376/151 |
| 2012/0281797 | A1 | 11/2012 | Ventikos et al. |
| 2013/0114774 | A1 | 5/2013 | Ventikos et al. |
| 2015/0139378 | A1 | 5/2015 | Hawker et al. |
| 2016/0012921 | A1 | 1/2016 | Ventikos et al. |
| 2016/0019984 | A1 | 1/2016 | Ventikos et al. |

FOREIGN PATENT DOCUMENTS

| | | |
|---|---|---|
| JP | H04158200 | 6/1992 |
| JP | H06198496 | 7/1994 |
| JP | 2001193381 | 7/2001 |
| WO | 02097823 A1 | 12/2002 |
| WO | 03034441 A1 | 4/2003 |
| WO | 2011064592 A1 | 6/2011 |
| WO | 2011138622 A1 | 11/2011 |

OTHER PUBLICATIONS

Taleyarkhan et al., "Evidence for Nuclear Emissions During Acoustic Cavitation," Science Mar. 8, 2002, v. 295 p. 1868.*

Seife, "'Bubble Fusion' Paper Generates a Tempest in a Beaker," Science Mar. 8, 2002, v. 295 p. 1808.*

Shapira et al., "Nuclear Fusion in Collapsing Bubbles—Is It There? An Attempt to Repeat the Observation of Nuclear Emissions from Sonoluminescence," Phys. Rev. Lett. v. 89, n. 10, Sep. 2, 2002, 104302.*

Galonsky, "Tabletop Fusion Revisited," Science, v. 297, Sep. 6, 2002, p. 1645.*

Taleyarkhan et al., "Additional evidence of nuclear emissions during acoustic cavitation," Phys. Rev. E v. 69 Mar. 22, 2004, 036109.*

Xu et al., "Confirmatory experiments for nuclear emissions during acoustic cavitation," Nuc. Engr. Des. v. 235, Feb. 21, 2005, p. 1317.*

Taleyarkhan et al., "Nuclear Emissions During Self-Nucleated Acoustic Cavitation," Phys. Rev. Lett. 96, 034301 Jan. 10, 2006.*

Peplow, "Desktop Fusion is Back on the Table," Jan. 10, 2006, doi:10.1038/news060109-5 last accessed Sep. 27, 2012.*

Ed. "Bubble fusion: silencing the hype," Mar. 8, 2006 doi:10.1038/news060306-1 last accessed Sep. 27, 2012.*

Naranjo, "Comment on 'Nuclear Emissions During Self-Nucleated Acoustic Cavitation'", Sep. 12, 2006, arXiv:physics/0603060v2 last accessed Sep. 27, 2012.*

Taleyarkhan et al., "Reply," Phys. Rev. Lett. 97 Oct. 6, 2006, 149404.*

"Report of the Investigation Committee In the Matter of Dr. Rusi P. Taleyarkhan." http://news.uns.purdue.edu/x/2008b/080718PurdueReport.pdf last accessed Sep. 27, 2012.*

Reich, "Bubble-fusion scientist debarred from federal funding," Nature, Nov. 23, 2009, doi:10.1038/news.2009.1103 last accessed Sep. 27, 2012.*

Bourne et al. "The temperature of a shock-collapsed cavity", Proceedings of the Royal Society London, Series A., 2003, pp. 1851-1861, vol. A, No. 459, XP000002654461, London.

Bourne, et al. Shock-induced collapse and luminescence by cavities, Philosophical Transactions of the Royal Society London, Series A., Feb. 1999, pp. 295-311, vol. 357, No. 1751, XP000002654463.

J. H. Brunton, "High speed liquid impact", Royal Society of London Philosophical Transactions Mathematical, Physical and Engineering Sciences, The Royal Society , Jul. 28, 1966, pp. 79-85, vol. 260, London GB, XP008135518.

J. P. Dear et al. "High-speed photography of surface geometry effects in liquid/solid impact", Journal of Applied Physics, Feb. 15, 1988, pp. 1015-1021, vol. 63, No. 4, XP002633349.

D. Felipe Gaitan et al. "Sonoluminescence and bubble dynamics for a single, stable, cavitation bubble", Journal Acoustical Society of America, Jun. 1992, pp. 3166-3183, vol. 91, No. 6.

K. K. Haller et al. "Computational study of high-speed liquid droplet impact", Journal of Applied Physics, American Institute of Physics, Sep. 1, 2002, pp. 2821-2828, vol. 92, No. 5, XP012057199.

K. K. Haller et al. "Wave structure in the contact line region during high speed droplet impact on a surface: Solution of the Riemann problem for the stiffened gas equation of state", Journal of Applied Physics, American Institute of Physics, Mar. 1, 2003, pp. 3090-3097, vol. 93, No. 5, XP012059198.

Nicholas A. Hawker et al. "Shock/Gas Bubble Interactions in Infinite and Finite Volumes of Liquid", 2nd Micro and Nano Flows Conference, Department of Engineering Science, University of Oxford, Sep. 1-2, 2009, pp. 1-5, West London UK.

International Search Report and Written Opinion issued Sep. 16, 2011 by European Patent Office re: PCT/GB2011/050889; pp. 12; citing: Tullis et al. "Cavitation Guide . . . ", Sushcikh et al. "Shock waves . . . ", Bourne et al., "The temperature . . . ", Bourne et al., "Shock-induced . . . " and WO 03/034441 A1.

International Search Report and Written Opinion issued Apr. 28, 2011 re: PCT/GB2010/051974, pp. 11; citing US 2008/037694 A1, Rein et al. "Phenomena of liquid . . . ", Haller et al. "Computational study . . . ", Haller et al. "Wave structure . . . ", Range et al. "Influence of surface . . . ", and US 2006/187277.

International Search Report and Written Opinion issued Jun. 9, 2011 re: PCT/GB2010/051976, pp. 11; citing: Brunton "High speed liquid . . . ", Rein et al. "Phenomena of liquid . . . ", Sivakumar et al. "Spreading behavior . . . ", US 2008/037694 A1, and Dear et al. "High-speed photography . . . ".

J. Paul Tullis, "Cavitation Guide for Control Valves", Tullis Engineering Consultants NUREG/CR-6031, Apr. 1993, pp. 1-106, XP000002654460, http://www.iaea.org/inis/collectin/NCLCollectionStore/_Public/24/072/24072618.pdf.

Kai Range et al. "Influence of surface roughness on liquid drop impact", Journal of Colloid and Interface Science, Jul. 1, 1998, pp. 16-30, vol. 203, CS985518, XP002632536.

Martin Rein et al. "Phenomena of liquid drop impact on solid and liquid surfaces", Fluid Dynamics Research, North-Holland, Aug. 1, 1993, pp. 61-93, vol. 12, No. 2, XP024733663.

D. Shapira et al. "Nuclear Fusion in Collapsing Bubbles—Is It There? An Attempt to Repeat the Observation of Nuclear Emisions from Sonoluminescence", The American Physical Society, Physical Review Letters, Sep. 2, 2002, pp. 104302-1-104302-4, vol. 89, No. 10.

D. Sivakumar et al. "Spreading behavior of an impacting drop on a structured rough surface", Physics of Fluids, Oct. 2005, pp. 1-10, vol. 17, No. 10, XP002633348.

Sushchikh et al. "Shock waves and flow patterns in a shock-induced bubble collapse", American Institute of Aeronautics and Astronautics, 2005, pp. 01-12, vol. AIAAA 2005-1291, XP000002654462.

R. P. Taleyarkhan et al. "Evidence for Nuclear Emissions During Acoustic Cavitation", Science, Research Articles, Mar. 2, 2002, pp. 1868-1873, vol. 295, downloaded from www.sciencemag.org on Nov. 24, 2009.

Japan Office Action for Japanese Patent Application No. 2013-508557, OA Transmission Date Mar. 10, 2015, 5 pages, non-English Translation.

Japan Office Action for Japanese Patent Application No. 2013-508557, OA Transmission Date Mar. 10, 2015, 9 pages, English Translation.

A. Philipp et al. "Cavitation erosion by single laser-produced bubbles", J. Fluid Mech., 1998, vol. 361, pp. 75-116.

B. Wolfrum et al. "Luminescence of transient bubbles at elevated ambient pressures", The American Physical Society, Sep. 25, 2001, vol. 64, pp. 046306-1-046306-5.

D. Felipe Gaitan et al. "Transient cavitation in high-quality-factor resonators at high static pressures", Journal of the Acoustical Society of America, Jun. 2010, vol. 127, No. 6, pp. 3456-3465; XP002715356.

Dennis Kroninger et al. "Particle tracking velocimetry of the flow field around a collapsing cavitation bubble", Exp Fluids, 2010, vol. 48, pp. 395-408.

(56) References Cited

OTHER PUBLICATIONS

Emil A. Brujan et al. "Properties of luminescence from laser-created bubbles in pressurized water", The American Physical Society, Dec. 21, 2005, vol. 72, No. 6, pp. 066310-1-066310-6, USA.

Eric Johnsen et al. "Numerical simulations of non-spherical bubble collapse", Journal of Fluid Mechanics, Jun. 25, 2009, vol. 629, pp. 231-262; XP002715357.

GB Office Action issued Sep. 24, 2012 re: Application No. GB1208939.7; citing: WO 2011/138622 A1 and WO 2011/064592 A1.

International Search Report and Written Opinion issued Nov. 20, 2013 re: Application No. PCT/GB2013/051297; pp. 1-11; citing: WO 2011/138622, Gaitan et al. "Transient", Johnsen et al. "Numerical" and Tullis Cavitation.

M. Barbaglia et al. "Search of Fusion Reactions During the Cavitation of a Single Bubble in Deuterated Liquids", Physica Scripta, 2005, vol. 72, pp. 75-78, Argentina.

Milton S. Plesset et al. "Bubble Dynamics and Cavitation", Annual Review Fluid Mech., 1977, vol. 9, pp. 145-185; www.annualreviews.org/aroline.

Werner Lauterborn et al. "News from bubble dynamics: high static pressures, shock waves and interior dynamics", The 19th International Symposium on Nonlinear Acoustics, 1 page.

Decorso et al.; "Erosion by Liquid Impact"; ASTM International; 1962; p. 41.

Hawker et al.; "Interaction of a Strong Shockwave with a Gas Bubble in a Liquid Medium: a Numerical Study"; J. Fluid Mech., vol. 701; 2012; pp. 59-97.

International Search Report for International Application No. PCT/GB2014/050661, International Filing Date Mar. 6, 2014, Date of Mailing Jul. 4, 2014, 5 pages.

International Search Report for International Application No. PCT/GB2014/050663, International Filing Date Mar. 6, 2014, Date of Mailing Jul. 4, 2014, 5 pages.

Johnsen et al.; "Shock-Induced Collapse of a Gas Bubble in Shockwave Lithotripsy"; J. Acoustical Society of America, vol. 124, No. 4; Oct. 2008; pp. 2011-2020.

Lauer et al.; "Numerical Investigation of Collapsing Cavity Arrays"; Physics of Fluids, vol. 24; 2012; pp. 1-24.

Matthujak et al.; "High Speed Jet Formation by Impact Acceleration Method"; Shock Waves, vol. 16; 2007; pp. 405-419.

Shi et al.; "Generation of High-Speed Liquid Jets by High-Speed Impact of a Projectile"; JSME Internation Journal, Series B, vol. 38, No. 2; 1995; pp. 181-190.

Shi et al.; "The Measurement of Impact Pressure and Solid Surface Response in Liquid-Solid Impact up to Hypersonic Range"; Wear, vol. 186-187; 1995; pp. 352-359.

Surov; "Interaction of a Shock Wave with a Bubble Screen"; Technical Physics, vol. 44, No. 1; Jan. 1999; pp. 37-43.

Swantek et al.; "Collapse of Void Arrays Under Stress Wave Loading"; Journal of Fluid Mechanics, vol. 649; Apr. 2010; pp. 399-427.

Written Opinion for International Application No. PCT/GB2014/050661, International Filing Date Mar. 6, 2014, Date of Mailing Jul. 4, 2014, 7 pages.

Written Opinion for International Application No. PCT/GB2014/050663, International Filing Date Mar. 6, 2014, Date of Mailing Jul. 4, 2014, 7 pages.

Japan Office Action for Japanese Patent Application No. 2012-540500, OA transmission date Apr. 28, 2015, 2 pages, non-English Translation.

Japan Office Action for Japanese Patent Application No. 2012-540500, OA transmission date Apr. 28, 2015, 3 pages, English Translation.

\* cited by examiner

FIG 6 ic # ENERGY FOCUSSING

TECHNICAL FIELD

This invention relates to methods and apparatus for focussing energy using high velocity liquid droplets or other projectiles striking a target.

BRIEF DESCRIPTION OF RELATED ART

The development of fusion power has been an area of massive investment of time and money for many years. This investment has been largely centred on developing a large scale fusion reactor, at great cost. However, there are other theories that predict much simpler and cheaper mechanisms for creating fusion. Of interest here is the umbrella concept "inertial confinement fusion", which uses mechanical forces (such as shock waves) to concentrate and focus energy into very small areas.

Much of the belief in inertial confinement fusion comes from observations of a phenomenon called sonoluminescence. This occurs when a liquid containing appropriately sized bubbles is driven with a particular frequency of ultrasound. The pressure wave causes the bubble to expand and then collapse very violently; a process usually referred to as inertial cavitation. The rapid collapse of the bubble leads to non-equilibrium compression that causes the contents to heat up to an extent that they emit light [Gaitan, D. F., Crum, L. A., Church, C. C., and Roy, R. A. Journal of the Acoustical Society of America 91(6), 3166-3183 June (1992]. There have been various efforts to intensify this process and one group has claimed to observe fusion [Taleyarkhan, R. P., West, C. D., Cho, J. S., Lahey, R. T., Nigmatulin, R. I., and Block, R. C. Science 295(5561), 1868-1873 March (2002)]. However, the observed results have not yet been validated or replicated, in spite substantial effort [Shapira, D. and Saltmarsh, M. Physical Review Letters 89(10), 104302 Sep. (2002)].

It has been proposed in U.S. Pat. No. 7,445,319 to fire spherical drops of water moving at very high speed (18 1 km/s) into a rigid target to generate an intense shock wave. This shock wave can be used to collapse bubbles that have been nucleated and subsequently have expanded inside the droplet. It is inside the collapsed bubble that the above-mentioned patent expects fusion to take place. The mechanism of shockwave generation by high-speed droplet impact on a surface has been studied experimentally and numerically before and is well-documented (including work by one of the present patent inventors, [Haller, K. K., Ventikos, Y., Poulikakos, D., and Monkewitz, P. Journal of Applied Physics 92(5), 2821-2828 September (2002)].)

BRIEF SUMMARY

The present invention aims to provide an alternative to the aforementioned techniques and may also have other applications. When viewed from a first aspect the invention provides a method of producing a localised concentration of energy comprising: providing a series of projectiles and firing said projectiles at a target, said target being configured such that upon striking said target, a said projectile traps and compresses a volume of gas between the projectile and the target, the target and projectile further being configured such that impact of the projectile onto the target gives rise to a converging shockwave inside the trapped volume of gas.

The invention also extends to apparatus for producing localised concentration of energy comprising: means for providing a series of projectiles, means for firing said projectiles at a target configured such that upon striking said target, said projectiles trap a volume of gas between the projectile and the target, the target and projectile further being configured such that impact of the projectile onto the target gives rise to a converging shockwave inside the trapped volume of gas.

The Applicant notes that the scope of the present invention does not extend to the shockwave comprising an ultrasound shockwave. Thus, the scope of the present invention does not include the pocket of gas being collapsed through the process of sonoluminescence.

Thus it will be seen by those skilled in the art that in accordance with the invention a volume of gas (or "bubble") is trapped by the projectile which gives rise to an intense concentration of energy within the gas by two mechanisms. The first mechanism is a simple transfer of kinetic energy from the particle into potential energy and subsequently into heat energy as the bubble is compressed while it arrests the motion of the projectile. This includes heating by the bow shock moving in front of the projectile and heating caused by the rebounding of this bow shock and subsequent interactions of further resulting shocks confined within the bubble.

The second mechanism is the transfer of energy from the converging shockwave generated by the impact between the projectile and the surface of the target which propagates from the projectile into the adjacent bubble. As the edge of the shock wave propagates towards the trapped volume, it is focussed, forming a contracting circle. When this shockwave eventually focuses down near to a point, it results in extremely high pressures and temperatures in the compressed bubble. The large reduction in density of the medium in which the shockwave is travelling in going from the projectile to the bubble means that the shockwave generates very high temperatures in the bubble, particularly as it converges to a point.

The invention described herein provides an alternative to the technique described in U.S. Pat. No. 7,445,319 which may carry its own benefits. The present inventors have recognised that there are significant challenges in the nucleation of a bubble in droplet fired at high speed into a target as suggested in U.S. Pat. No. 7,445,319. The timing will have to be very precise for the bubble to be at the right moment of its expand-collapse cycle when the shock strikes. By contrast such complexity and associated expense can be avoided in accordance with at least preferred embodiments of the present invention. Moreover the modelling of both techniques carried out by the present inventors suggests that for the same droplet impact velocity, a method in accordance with the invention can give pressure and temperature intensities which are an order of magnitude greater.

The gas is typically trapped from the surroundings in which the target is placed. The term 'gas' as used herein should be understood generically and thus not as limited to pure atomic or molecular gases but also to include vapours, suspensions or micro-suspensions of liquids or solids in a gas or any mixture of these.

It is envisaged in accordance with the invention that the projectiles could be solid or semi-solid e.g. a gel or a polymer, or any material that can be accelerated to suitable speeds, entrap a gaseous volume on a surface and generate the energy density focussing mechanisms described above for pressure and temperature intensification. In a preferred set of embodiments however, the projectiles comprise droplets of liquid. In one particular set of embodiments, the liquid droplets are produced by the apparatus described in U.S. Pat. No. 7,380,918.

The projectile will typically need to be moving fast enough to generate the shockwave which propagates in the bubble. The desired speed may depend upon the size and material of the projectile, the shape and size of the target, the composition of the gas being trapped etc. In one set of preferred embodiments the projectile has a speed of more than 250 m/s, e.g. more than 500 m/s, e.g. more than 750 m/s. In some embodiments the speed is up to 1000 m/s or more.

There are many shapes and configurations which the target structure might take in order to provide suitable regions for entrapment of a volume of gas when struck by a projectile and which give rise to a converging shockwave into the trapped gas. In one set of embodiments, the target comprises a concave surface shaped so as at least partially to receive the projectile and trap said gas beneath the projectile. The term "beneath" used here should be understood in the frame of reference where the projectile approaches the target from above; no particular spatial orientation relative to any other object or gravity should be inferred. Moreover it should not be inferred that the projectile necessarily approaches the target in a perpendicular manner in the frame of reference of the target.

Such a concave surface as described above may be one which tapers to a cross-sectional area sufficiently small that the projectile cannot fully enter it. The tapered sides could be straight or curved (when viewed in cross-section). Equally the concave surface may have a shape comprising at least a portion having a curvature greater than the curvature of the projectile. In fact if consideration is given to the practical impossibility of producing a perfectly sharp apex in the target, the former condition can be seen merely as a subset of the latter.

Having the projectile at least partly received by the concave target surface gives rise to the desired entrapment of a volume of gas between the target and the projectile. Such arrangements are advantageous as they have been found to give rise to a very strong toroidal shockwave which travels away from the point of impact, into the projectile. As the edge of the shock wave propagates towards the trapped volume, it is focussed, forming a contracting circle. When this shockwave eventually focuses down near to a point, it results in extremely high pressures and temperatures in the compressed bubble.

In another set of embodiments, the target structure comprises a target surface having a discrete depression defined therein which is narrower than the width of the projectile. For example, where the depression has continuous rotational symmetry, as is preferred, its diameter should be less than the maximum width of the projectile. Where the projectile is spherical, as is typically the case, the depression would therefore be of smaller diameter than the diameter of the projectile. A possible advantage associated with a discrete depression of the sort described above is that the volume of gas trapped by the projectile can be closely controlled, whereas in the case of a narrowing concavity into which the projectile is received, the precise volume of gas which is trapped may be dependent to an extent on the precise diameter of the projectile and which may exhibit a statistical variation.

The invention is not limited to a single depression in which gas is trapped by the projectile, and thus in a set of embodiments, the target structure comprises a plurality of depressions. Clearly depending upon the number of such depressions, the size of an individual depression will be significantly smaller than the size of the projectile. Each individual depression may be shaped to encourage the energy focusing by the converging shockwave as described above. An advantage of employing a plurality of depressions is that a greater proportion of the projectile energy may be harnessed. This is especially true for larger projectiles and points towards simplicity of manufacturing for an energy-producing fusion apparatus.

Such pluralities of depressions could be formed in a number of ways. For example, a solid target could be drilled or otherwise machined to produce depressions or pits. In one set of embodiments, however, the depressions are created by the surface texture of the target. For example, the target could be blasted with an abrasive material, etched or otherwise treated to give a desired degree of surface roughness which provides, at the microscopic level, a large number of pits or depressions.

The two sets of embodiments described above: a concave target surface accommodating the projectile; and a target surface having one or more smaller, discrete depressions, are not mutually exclusive. Thus, for example, a target surface might be concave so as at least partially to receive the projectile, whilst also comprising one or more discrete depressions. Such combination could be beneficial in providing the desired behaviour of the shockwave generated inside the projectile, whilst also enjoying the advantages of compressing a plurality of volumes of gas.

In a preferred set of embodiments, the methods described herein are employed to generate nuclear fusion reactions. The fuel for the reaction could be provided by the droplet, the trapped gas bubble, or the fuel could be provided by the target itself. Any of the fuels mentioned in U.S. Pat. No. 7,445,319 is suitable for use in the present invention. The target itself could be constructed from a solid, as implied in many of the embodiments outlined above, but it could equally well be a liquid. In the case of a solid, any of the proposed materials in U.S. Pat. No. 7,445,319 could be suitable. In the case of a liquid the required target surface shape could be achieved in a number of ways. For example, the surface of a volume of liquid could be excited with a suitable vibration (e.g. using ultrasound or another method) to generate a wave having the desired shape. Alternatively the desired shape could be achieved through the contact angle between a liquid and a solid surface with appropriately matched wetting properties. Of course, this latter example shows that the surface could comprise a combination of solid and liquid.

The volume of gas which is trapped may be chosen depending on the circumstances but in one set of preferred embodiments is between $5 \times 10^{-11}$ and $5 \times 10^{-7}$ liters. As will be apparent from the discussion above, this could be in a single volume or distributed between a plurality of depressions.

The fusion reactions which can be obtained in accordance with certain embodiments of the invention could be used for net energy production (the long term research aim in this field), but the inventors have appreciated that even if the efficiency of the fusion is below that required for net energy production, the reliable fusion which is obtainable in accordance with embodiments of the invention is advantageous for example in the production of tritium which can be used as fuel in other fusion projects and is very expensive to produce using currently existing technologies. The fusion can also be beneficial in giving a fast and safe neutron source which has many possible applications that will be apparent to those skilled in the art.

Moreover, it is not essential in accordance with the invention to produce fusion at all.

BRIEF DESCRIPTION OF THE DRAWINGS

Certain embodiments of the invention will now be described, by way of example only, with reference to the accompanying drawings, in which.

DETAILED DESCRIPTION

Figure 1A:
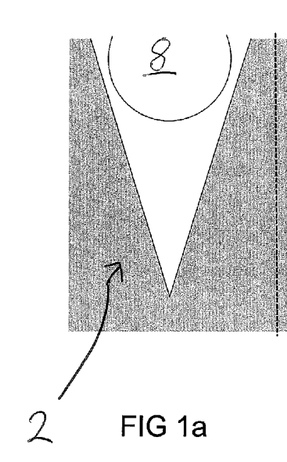
FIGS. 1a to 1c are three variants of a target in accordance with the invention.
Figure 1B:
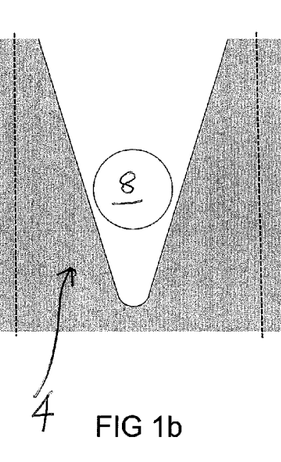
Figure 1C:
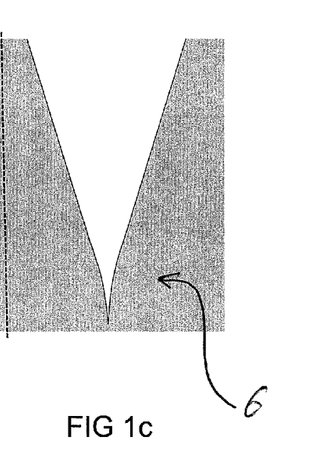

FIGS. 1a to 1c show three similar variants of a concave targets 2, 4, 6 which have a tapering cross-section so that when a droplet 8 of appropriate size is fired at the respective target, the taper prevents it reaching the bottom of the concavity and thus a volume of the gas inside the concavity is trapped to form a bubble 10 between the droplet 8 and the target 2, 4, 6. The subsequent process may be seen in greater detail with reference to FIGS. 2a to 2c. In each of the three cases shown in FIGS. 1a, 1b and 1c, the target 2, 4, 6 has, at some point, a radius of curvature which is less than the radius of the droplet 8. In the case of FIGS. 1a and 1c which show apparently point apexes, it will be appreciated that in practice these will have a degree of rounding which inevitably has a smaller radius of curvature than the droplet radius.

Figure 2A:
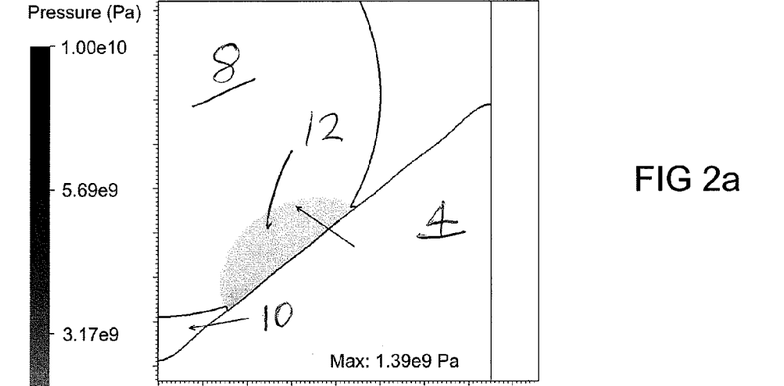
FIGS. 2a to 2c are progressive illustrations of the compression of a bubble generated by a computational fluid dynamics simulation.
Figure 2B:
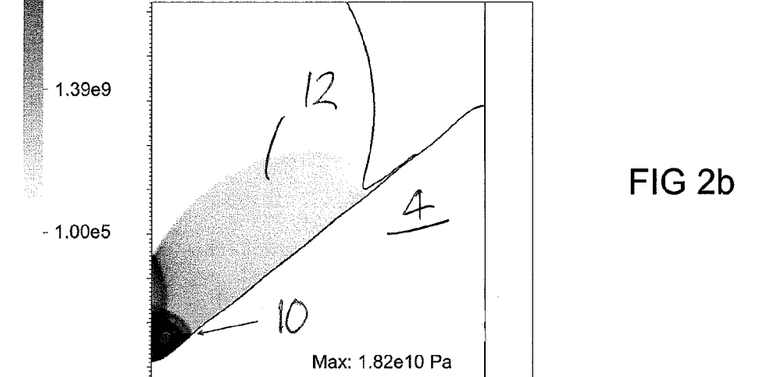
Figure 2C:
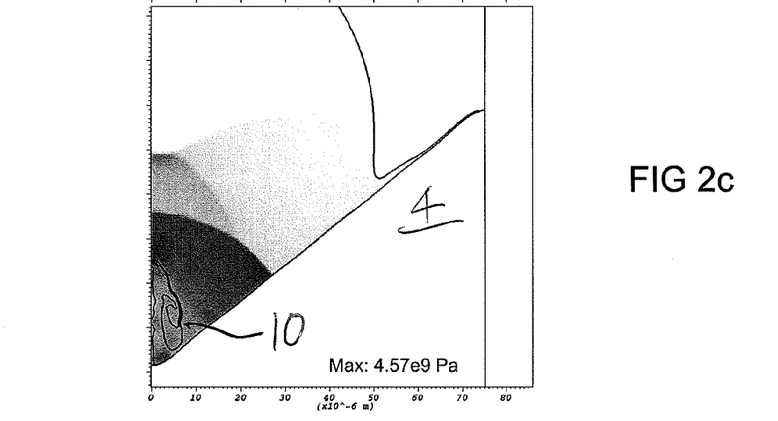
Figure 3A:
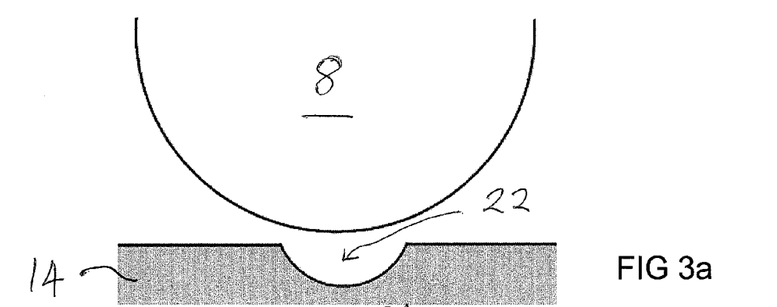
FIGS. 3a to 3d are variants of targets having discrete depressions in accordance with the invention.
Figures 3B, 3C:
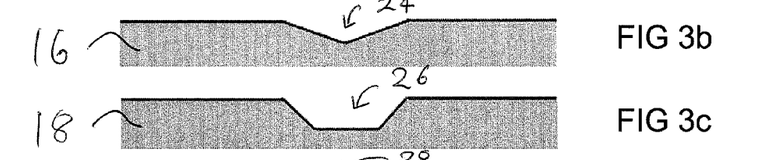
Figure 3D:
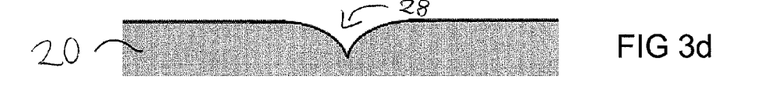
Figure 4A:
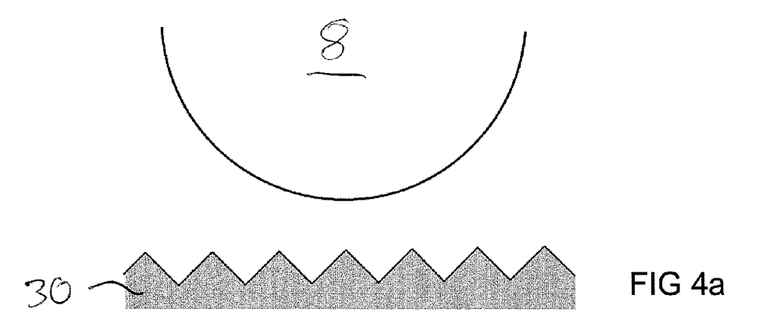
FIGS. 4a to 4d are illustrations of various possible embodiments having multiple depressions.
Figure 4B:
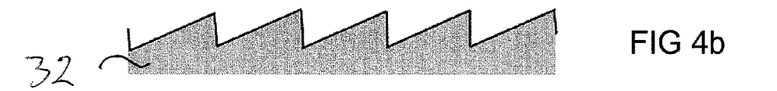
Figure 4C:
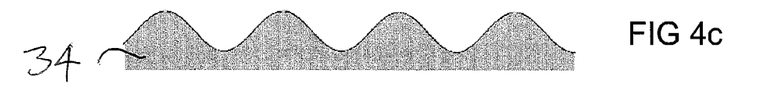
Figure 4D:
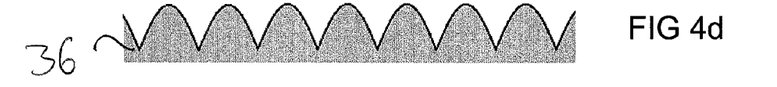

FIG. 2a shows the situation shortly after the droplet 8 has hit the target 4. Only one half is shown, but the other half is symmetrically identical. It may be seen that the droplet 8 entraps a bubble of gas 1 0 between the surface of the droplet 8 and the tapering target surface 4. As the droplet 8 deforms, it compresses the bubble 10 so transferring its kinetic energy into energy in the bubble. Also on impact, a shockwave 12 is generated which begins to propagate into the droplet. As may be appreciated by considering the rotationally symmetric geometry, this shockwave is toroidal in shape. As the edge of the shockwave 12 propagates along the interface between the droplet 8 and the trapped bubble 10, it is focused, forming a contracting circle (FIG. 2b). When the shockwave eventually focuses down to a near point, it results in the generation of extreme pressures and temperatures in the compressed bubble 10 (FIG. 2c). For example, simulations have shown that for a droplet of size 100 microns travelling at a velocity of 500 meters per second striking an inverted conical target of cone angle approximately 45 degrees, pressures approaching 200,000 bar and temperatures exceeding 1,000,000° C. are observed. It will be appreciated, however, that there are a large number of parameters that influence the actual results achieved, for example liquid density, ambient pressure and temperature, composition of the gas and of the liquid, impact angle and surface shape.

FIGS. 3a to 3d show respective variants of embodiments in which the target surface 14 to 20 has a single discrete depression 22 to 28 formed therein. As may be appreciated from the diagram, these depressions 22 to 28 will typically be significantly smaller than the droplet 8. This means that the volume of gas which is entrapped is essentially independent of small variations in the size of the droplet 8. These embodiments work in the same way as was described above for the embodiments described above by compressing the trapped bubble and intensifying the pressure therein from the shockwave generated by the impact with the target.

FIGS. 4a to 4d show variants of embodiments with multiple depressions, in several of which corresponding bubbles can be trapped by a droplet striking the target 30 to 36. The number of bubbles trapped will depend upon the size of the depressions relative to the size of the droplet 8. The surface shapes giving rise to these depressions are merely schematic and illustrative and there are of course many possible variants. They could be created by surface finishing or roughening processes rather than by explicit machining. One of the advantages of this would be that there is a lower requirement for accurate alignment between the droplet 8 and the target 30 to 36. It also means that a single target for receiving multiple streams of droplet simultaneously can be easily prepared. It also opens up the possibility of having a moving, e.g. rotating or sliding target which will carry benefits such as: renewal of target material, harnessing of produced energy, reduction in the need for precision targeting.

Figure 5:
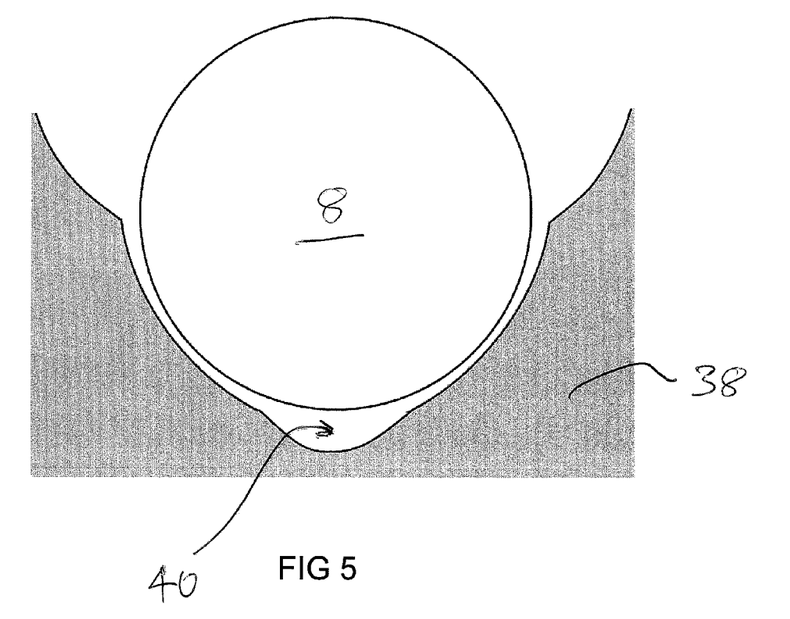
FIG. 5 is an illustration of an embodiment which is both curved and has a discrete depression.

FIG. 5 shows another embodiment of the invention in which the target surface 38 is concave and at least partly conforms to and receives the droplet 8, but has at the bottom a discrete depression 40. The curved, more conforming shape can be beneficial in intensifying the shockwave generated when the droplet 8 strikes the target 38 which in turn intensifies the pressures and temperatures inside the bubble trapped in the depression 40.

Figure 6:
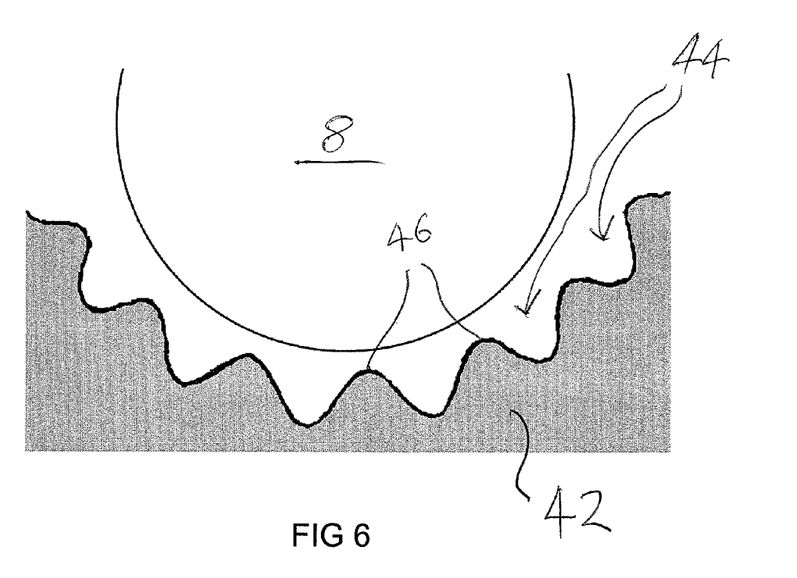
FIG. 6 is an illustration of an embodiment having both multiple depressions and a curved overall surface shape.

Finally, FIG. 6 shows an extension of the idea described above in which the surface 42 has a plurality of discrete depressions 44, each of which may trap a bubble of gas. The depressions could be annular—i.e. continuous in the rotational direction of the target—but are preferably discrete in the rotational direction of the target. Moreover, the peaks 46 between the depressions 44 each create a shockwave inside the bubble 8 which, with appropriate optimisation, can be made to converge and reinforce one another in such a way as to further intensify the energy concentrated in the bubbles in each depression 44.

In all of the embodiments described, the apparatus can be used by firing a stream of very high velocity droplets, e.g. of water, by producing a stream of liquid which is then broken up using the apparatus described in U.S. Pat. No. 7,380,918. In an exemplary implementation the droplets have a diameter of approximately 150 microns, travel at a speed of approximately 1 kilometer a second and are produced at a frequency of approximately 1 Megahertz. In computational modelling, this gave rise to a peak pressure of $4.6 \times 10^9$ Pascals which is sufficient to cause temperatures in excess of $1 \times 10^6$ degrees C. which can be sufficient for a nuclear fusion reaction of the deuterium atoms. The resulting neutrons can either be used in other processes or, in one example, may be absorbed by a neutron absorber for conversion of the kinetic energy of the neutrons to thermal energy and thus conventional thermodynamic energy generation.

However, there are many other ways of producing power. For example Boron-Hydrogen fusion could also be used. Boron-Hydrogen fusion results in Helium nuclei and the methods used to harness the energy from this reaction could be very different—e.g. moving charge could generate electricity directly. Moreover it is not essential for fusion to take place; the enhanced pressures and temperatures caused inside the collapsed bubble by the target shapes in accordance with the invention may be useful in other contexts to study other reactions under exotic conditions.

The invention is applicable in all such contexts as well as many others.

The invention claimed is:

1. A method of producing a localised concentration of energy comprising:

providing a series of projectiles and firing said projectiles at a target, wherein said projectiles have a radius of curvature and said target comprises a concave surface at the point of impact of the projectiles, the concave surface having a radius of curvature at the point of impact of the projectiles that is less than the radius of curvature of the projectiles such that upon striking said target, the concave surface at least partially receives a said projectile and said projectile traps and compresses a volume of gas between the projectile and the concave surface, such that impact of the projectile onto the target gives rise to a converging shockwave inside the trapped volume of gas.

2. A method as claimed in claim 1, wherein the projectiles comprise droplets of liquid.

3. A method as claimed in claim 1, wherein the projectile has a speed of more than 500 m/s.

4. A method as claimed in claim 1, wherein the target structure comprises a target surface having a discrete depression defined therein which is narrower than the width of the projectile.

5. A method as claimed in claim 4, wherein the target structure comprises a plurality of depressions.

6. A method as claimed in claim 1, wherein the volume of gas which is trapped is between $5 \times 10^{-11}$ and $5 \times 10^{-7}$ liters.

7. An apparatus for producing localised concentration of energy comprising:

an arrangement for providing a series of projectiles, an arrangement for firing said projectiles at a target, wherein the projectiles have a radius of curvature and the target comprises a concave surface at the point of impact of the projectiles, the concave surface having a radius of curvature at the point of impact of the projectiles that is less than the radius of curvature of the projectiles such that upon striking said target, the concave surface at least partially receives the projectiles and said projectiles trap a volume of gas between the projectile and the concave surface, such that impact of the projectile onto the target gives rise to a converging shockwave inside the trapped volume of gas.

8. An apparatus as claimed in claim 7, wherein the projectiles comprise droplets of liquid.

9. An apparatus as claimed in claim 7, wherein the projectile has a speed of more than 500 m/s.

10. An apparatus as claimed in claim 7, wherein the target structure comprises a target surface having a discrete depression defined therein which is narrower than the width of the projectile.

11. An apparatus as claimed in claim 10, wherein the target structure comprises a plurality of depressions.

12. An apparatus as claimed in claim 7, wherein the volume of gas which is trapped is between $5 \times 10^{-11}$ and $5 \times 10^{-7}$ liters.

* * * * *